UNITED STATES PATENT OFFICE.

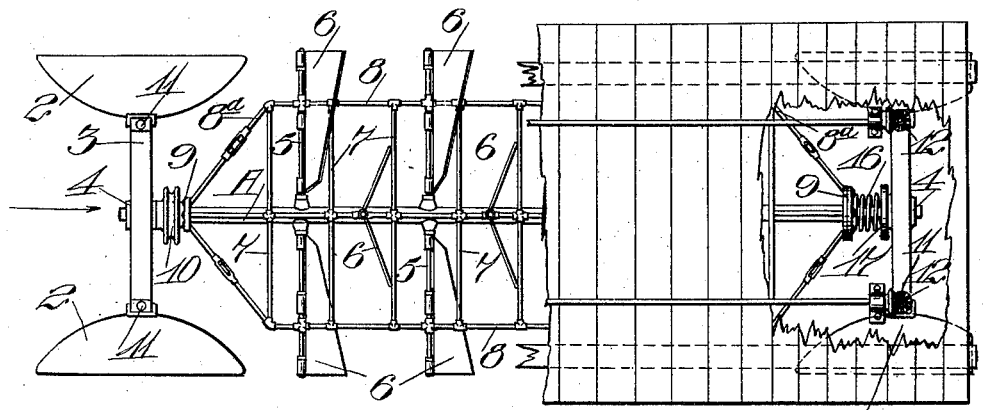

JOSEPH T. CROSS, OF SAN FRANCISCO, CALIFORNIA, ASSIGNOR TO FRANK H. HOWARD, OF SAN FRANCISCO, CALIFORNIA.

WAVE AND CURRENT MOTOR.

986,802.  Specification of Letters Patent.  Patented Mar. 14, 1911.

Application filed June 13, 1910. Serial No. 566,532.

*To all whom it may concern:*

Be it known that I, JOSEPH T. CROSS, a citizen of the United States, residing in the city and county of San Francisco and State of California, have invented new and useful Improvements in Wave and Current Motors, of which the following is a specification.

My invention relates to a device for utilizing the movements of the waves or swells of the sea, or of currents of rivers and the like.

It consists of a journaled shaft capable of revolution upon its axis, a plurality of vanes or floats carried by radial supports, said vanes projecting to one side of the radial supports upon which they are turnable, and stops to limit the movement of the vanes so that when a flow of water moving parallel to the axis of the shaft strikes these vanes they will swing so that they stand at an angle with the movement of the water, and this angular position of the vanes will revolve the shaft by which they are carried.

It also comprises the combination of parts and details of construction which will be more fully explained by reference to the accompanying drawings, in which—

Figure 1 is a partial plan view of my apparatus. Fig. 2 is an end view. Fig. 3 is a fragmentary view showing the adjusting clamps.

A is a shaft which is journaled at its ends and at such intermediate points as its length makes desirable. This shaft is journaled substantially horizontal and in the direction of the flow of the water by which the apparatus is to be operated. In the present case I have illustrated the device as being intended to be actuated by the rush or swell of the tide of the sea. I have, therefore, shown piers 2, with a transverse support 3, which carries the journal boxes of the bearings 4 of the shaft A. I have shown the piers 2 as having segmental surfaces presented toward each other, and these, or equivalent forms, serve in a measure to direct the flow of water between them.

5 are rods or shafts of suitable size, having their inner ends fixed to hubs or other supports upon the shaft A, and these shafts 5 radiate from the shaft A and are of such length that the vanes 6, having one edge journaled upon the shafts 5 and the other edge projecting outwardly therefrom, will be submerged in the tide which flows beneath, and for that purpose the bearings 4 of the shaft A are supported at a suitable distance above the surface of the water.

If the apparatus is to be used where there is a considerable rise and fall of the tide, it may be supported upon floats or the bearings of the shaft A may be made vertically adjustable, so that the apparatus can be raised or depressed with the movement of the tide, and sufficiently to maintain the vanes 6 at a proper degree of submergence below the shaft. Between these vanes may be located the annular rings or stops 7, which are so located with reference to the vanes that as the latter swing upon their journaled shafts 5 they will contact with the stops 7 upon either one side or the other, and these contacts are so designed that the vanes will stand diagonal to the axis of the shaft A. In this position it will be seen that the flow of water in one direction striking the vanes will swing them all upon one side of their respective shafts, and to substantially the same angle with relation to the flow of water, and the water striking against these angularly disposed vanes, will tend to force them to one side. The resolution of this force caused by the vanes being carried by a revoluble shaft will act to revolve said shaft and any set of vanes running at a point of submergence in the flowing water will be thus acted upon.

In the case of a tide or swell which flows in one direction toward the beach and then returns, the return movement will act immediately to swing the propeller blades 6 in the opposite direction and they will contact against the stops upon the other side of their journal shafts, thus holding the vanes in position to be again acted upon by the return flow of the water, and this continues the revolution of the shaft A. In order to support the shafts 5 and stops 7, I have shown brace rods 8, extending parallel with the shaft A and forming supports for the radial shafts 5 and the stops 7 at a suitable distance away from the shaft A. The ends of these rods or supports 8 converge, as shown at 8ª, and connect with suitable hubs or disks 9 near the ends of the shaft A, and any suitable means may be employed, such as turn-buckles, for maintaining the tension and rigidity of these supports. Motion may be transmitted from the shaft A by means of pulleys 10 with intermediate endless flexible belts. If used in streams which flow continuously in one direction, the vanes may be set at the desired working angle and remain stationary.

In order to raise or depress the revoluble shaft and its attachments the ends of the shaft support 3 are supported by vertically disposed screws 11 to the upper ends of which are secured bevel gears 12, and these are connected to move in unison by transverse shafts 13 and transmitting gears. The upper and lower belt or chain pulleys 10 are connected by jointed arms or bars 14, and contiguous to the joints are direction pulleys 15, over which the transmitting belts pass. The jointed arms 14 are thus movable to compensate for the raising or depression of the power shaft, and the pulleys 15 maintain the tension of the transmitting belts. In order to relieve the apparatus of shocks which might be caused by the rush of the waves or swell, springs 16 may be interposed between the disk or collar 9 and a support 17 at the thrust end of the shaft A.

Having thus described my invention, what I claim and desire to secure by Letters-Patent, is—

1. A current motor, comprising a power transmitting shaft, bearings therefor, a plurality of spaced frame rings, radial braces, connecting said rings to the shaft, longitudinal frame bars connecting said rings, spindles extending between the shaft and bars and located between the rings, and automatically turnable propeller blades having one edge journaled upon the braces, said blades adapted to swing to and fro against the rings and to be supported thereby.

2. A current motor comprising a power transmitting shaft, vertically adjustable bearings therefor, radial, spaced braces, rings secured on their ends, longitudinal frame bars connected to the outer ends of the braces and intersecting the rings, diametrically disposed spindles secured centrally between the spaced rings and supported in the shaft and bars, and oscillatory blades journaled upon the spindles and adapted to swing to and fro against the rings and be supported thereby.

3. A current motor comprising a power shaft, adjustable bearings therefor, a plurality of equally spaced diametrically disposed spindles secured to said shaft, adjacent spindles being set at quarters on the shaft, blades having one edge freely mounted upon said spindles, and ring frames at each side of the spindles and adapted to form stops for the free side edges of the blades.

In testimony whereof I have hereunto set my hand in the presence of two subscribing witnesses.

JOSEPH T. CROSS.

Witnesses:
  CHARLES A. PENFIELD,
  CHARLES EDELMAN.

---

Copies of this patent may be obtained for five cents each, by addressing the "Commissioner of Patents, Washington, D. C."